(12) United States Patent
Harper (10) Patent No.: US 9,938,830 B2
(45) Date of Patent: Apr. 10, 2018

(54) STUB SHAFT

(71) Applicant: ROLLS-ROYCE PLC, London (GB)

(72) Inventor: Callum Harper, Derby (GB)

(73) Assignee: ROLLS-ROYCE plc, London (GB)

( * ) Notice: Subject to any disclaimer, the term of this patent is extended or adjusted under 35 U.S.C. 154(b) by 390 days.

(21) Appl. No.: 14/688,521

(22) Filed: Apr. 16, 2015

(65) Prior Publication Data

US 2015/0322792 A1    Nov. 12, 2015

(30) Foreign Application Priority Data

May 8, 2014   (GB) .................................. 1408129.3

(51) Int. Cl.
   *F01D 5/02*   (2006.01)
   *F01D 1/02*   (2006.01)
   (Continued)

(52) U.S. Cl.
   CPC ............... *F01D 5/025* (2013.01); *F01D 1/02* (2013.01); *F01D 5/026* (2013.01); *F01D 21/02* (2013.01);
   (Continued)

(58) Field of Classification Search
   CPC . F01D 5/026; F01D 21/02; F16D 1/06; F16D 3/06; F16D 3/08; F16D 9/06
   See application file for complete search history.

(56) References Cited

U.S. PATENT DOCUMENTS 2,888,258 A    5/1959   Hoffstrom
3,150,506 A    9/1964   Alcaro
(Continued)

FOREIGN PATENT DOCUMENTS

EP    1008726 A2    6/2000
FR     364769 A     8/1906
(Continued)

OTHER PUBLICATIONS

Aug. 28, 2015 Search Report issued in European Patent Application No. 15 16 3718.
(Continued)

*Primary Examiner* — Woody Lee, Jr.
*Assistant Examiner* — Brian O Peters
(74) *Attorney, Agent, or Firm* — Oliff PLC (57) ABSTRACT

A controlled collapse stub shaft is provided for allowing controlled axial movement of a mainline shaft which joins a fan or compressor to a turbine of a gas turbine engine. A first end of the stub shaft is adapted to be joined to the mainline shaft. A second end of the stub shaft is adapted to be joined to a part of the engine which is axially stationary relative to the controlled axial movement of the mainline shaft. The stub shaft further has an annular body between the first and second ends. The body contains a plurality of axially-spaced circumferential rows of circumferentially-extending slots, inter-slot ligaments being formed between the slots of each row. Successive rows are offset. In this way, the ligaments of the axially forwardmost and rearwardmost rows excepted, each ligament is sandwiched between a forward slot and a rearward slot of its neighboring rows. Further, each ligament is joined to adjacent ligaments of its neighboring rows by circumferentially-extending bars having a thickness in the axial direction corresponding to the axial spacing between the rows. The bars are axially deflectable to allow the axial distance between the first and second ends of the stub shaft to decrease.

13 Claims, 9 Drawing Sheets

(51) Int. Cl.
*F01D 21/04* (2006.01)
*F01D 21/02* (2006.01)
*F16F 15/10* (2006.01)
*F16D 9/06* (2006.01)

(52) U.S. Cl.
CPC ............... *F01D 21/04* (2013.01); *F16D 9/06* (2013.01); *F16F 15/10* (2013.01); *F05D 2220/32* (2013.01); *F05D 2240/62* (2013.01); *F05D 2260/15* (2013.01); *F05D 2260/30* (2013.01); *F05D 2260/311* (2013.01); *F05D 2260/40* (2013.01); *F05D 2260/52* (2013.01)

(56) References Cited

U.S. PATENT DOCUMENTS

| | | |
|---|---|---|
| 3,245,734 A | 4/1966 | Morley |
| 3,390,546 A | 7/1968 | Jewell |
| 4,046,430 A * | 9/1977 | Buono .................. F01D 25/164 384/99 |
| 6,212,974 B1 * | 4/2001 | Van Duyn ................. F02C 7/32 244/54 |
| 6,338,578 B1 | 1/2002 | Adde et al. |
| 2010/0158699 A1 | 6/2010 | Makuszewski |

FOREIGN PATENT DOCUMENTS

| | | |
|---|---|---|
| GB | 2043833 A | 10/1980 |
| GB | 2079402 A | 1/1982 |
| GB | 2494178 A | 3/2013 |

OTHER PUBLICATIONS

Nov. 24, 2014 Search Report issued in British Patent Application No. 1408129.3.

* cited by examiner

STUB SHAFT

FIELD OF THE INVENTION

The present invention relates to a controlled collapse stub shaft.

BACKGROUND OF THE INVENTION

A turbofan engine has a propulsive fan and compressor driven by a series of turbine sections. The turbine sections are connected to the fan and compressor by a series of mainline shafts extending in the axial direction of the engine.

In the event of a mainline shaft failure the decoupled turbine has a tendency to overspeed, potentially leading to failure of a turbine disc. It is advantageous to allow the rear portion of the failed shaft to move rearwards leading to tangling in the turbine, thereby reducing overspeed.

In some engine designs, in the event on a mainline shaft failure rearwards movement of the rear section of the shaft can be limited due to a clash in a roller bearing. In such designs, the roller bearing race can be connected to the mainline shaft via a stub shaft.

SUMMARY OF THE INVENTION

It would be desirable to allow a stub shaft to collapse under the high axial load caused by such a clash to enable adequate rearwards movement of the mainline shaft. Accordingly, an aim of the present invention is to provide a collapsible structure for a stub shaft. However, in addition it would be desirable for the stub shaft to maintain a relatively consistent reactive load during axial compression and to remain partially elastic so that on relaxing of some of the compressive displacement the stub shaft maintain a reactive force. Such a combination of properties can allow controlled rearward movement of a rear portion of the mainline shaft without compromising bearing location after activation of the collapsible structure.

Thus, in a first aspect, the present invention provides a controlled collapse stub shaft for allowing controlled axial movement of a mainline shaft which joins a fan or compressor to a turbine of a gas turbine engine, a first end of the stub shaft being adapted to be joined to the mainline shaft, a second end of the stub shaft being adapted to be joined to a part of the engine which is axially stationary relative to the controlled axial movement of the mainline shaft, and the stub shaft further having an annular body between the first and second ends, the annular body containing a plurality of axially-spaced circumferential rows of circumferentially-extending slots, inter-slot ligaments being formed between the slots of each row, and successive axially-spaced rows being offset, whereby, the ligaments of the axially forwardmost and rearwardmost rows excepted, each ligament is sandwiched between a forward slot and a rearward slot of its neighbouring rows, and each ligament is joined to adjacent ligaments of its neighbouring rows by circumferentially-extending bars having a thickness in the axial direction corresponding to the axial spacing between the rows, wherein the bars are axially deflectable to allow the axial distance between the first and second ends of the stub shaft to decrease.

Under initial compression, the bars can bend, pushing the ligaments into the slots, and allowing the stub shaft to act as a spring. However, once the overall compression of the stub shaft is greater than the width of the slots, yielding or failure of the bars will not cause a loss of reactive force. When a bar yields or fails, the load it was carrying is distributed to adjacent bars of its row, increasing the stresses in them and causing them also to yield or fail. The ligaments of the row then move into the slots of the neighbouring row until stopped by contact on the opposite sides of these slots. This contact prevents the loss of reactive load even if all the bars in a row yield or fail.

In a second aspect, the present invention provides a gas turbine engine having a mainline shaft which joins a fan or compressor of the engine to a turbine of the engine, and the stub shaft of any one of the previous claims for allowing controlled axial movement of the mainline shaft, the first end of the stub shaft joining to the mainline shaft, and the second end of the stub shaft joining to a part of the engine which is axially stationary relative to the controlled axial movement of the mainline shaft.

For example, the axially stationary part of the engine can be a bearing race.

Optional features of the invention will now be set out. These are applicable singly or in any combination with any aspect of the invention.

The first end of the stub shaft may be its front end, and the second end of the stub shaft may be its rear end.

Typically, the stub shaft may contain six or more, eight or more, or ten or more circumferential rows of spaced slots.

The ratio of the length to the width of the slots may be at least 3:1, and preferably at least 5:1. Additionally or alternatively, the ratio of the length of the slots to the thickness in the circumferential direction of the ligaments may be at least 3:1, and preferably at least 5:1.

The thickness in the axial direction of the bars may be less than the width of the slots. Additionally or alternatively, the thickness in the axial direction of the bars may be less than the thickness in the circumferential direction of the ligaments.

The slots may have arcuate ends at the ligaments. This can help to avoid undesirable stress concentrations in the ligaments.

The long edges of the slots may be parallel to each other. Additionally or alternatively, the long edges of the slots may be straight-sided.

Every other row may be aligned such that the ligaments of these (alternate) rows are at the same angular positions.

Each ligament may be sandwiched between the midpoints of the forward and rearward slots of its neighbouring rows.

Conveniently, the body may have a first annular flange at the first end for joining to the mainline shaft. Additionally or alternatively, the body may have a second annular flange at the second end for joining to the axially stationary part of the engine.

The stub shaft may further have one or more shear formations (such as shear pins) at the second end of the stub shaft, the shear formations forming a load path for transmitting axial loads between the axially stationary part of the engine and the mainline shaft. In this way, the typically high initial axial loads at the onset of mainline shaft failure can bypass the annular body. Controlled collapse of the stub shaft via deflection of the bars can thus be reserved for when an axial load is applied which shears the shear formations, removing their axial load transmitting capacity. For example, the shear formations can extend between the second end of the stub shaft and the mainline shaft.

The stub shaft may further have a second annular body coaxial with the first annular body, the second annular body providing the first end of the stub shaft adapted to be joined to the mainline shaft, and the first annular body providing the second end of the stub shaft adapted to be joined to the axially stationary part of the engine. For example, the first annular body can be in the form of a sleeve which surrounds the second annular body. Having such a two body construction can help to prevent, in normal running, torque loads, such as wind-up torque, being transmitted through the first annular body. When the stub shaft has one or more shear formations, these can conveniently extend between the first and second annular bodies at the second end of the stub shaft.

In the case of the two body construction for the stub shaft, the first annular body may be rotationally fixed relative to the second annular body. Thus, in an example when the above-mentioned shear formations have sheared and the first annular body is undergoing controlled collapse, the rotational fixing can prevent the first annular body spinning on the second annular body due to friction torque from contact with the axially stationary part of the engine (e.g. bearing race).

A radial clearance may be formed between the first and the second annular bodies. This can help to prevent the bars from interfering with the second annular body when they deflect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
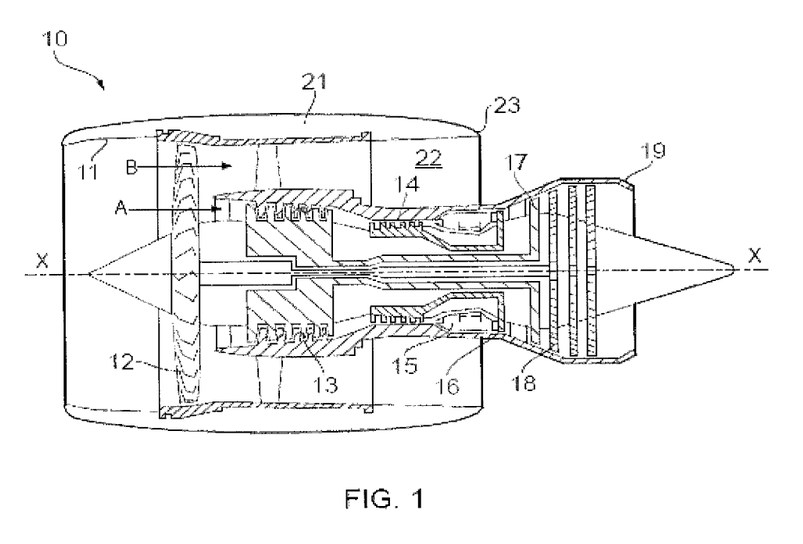
FIG. 1 shows longitudinal section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting mainline shafts.

Figure 2:
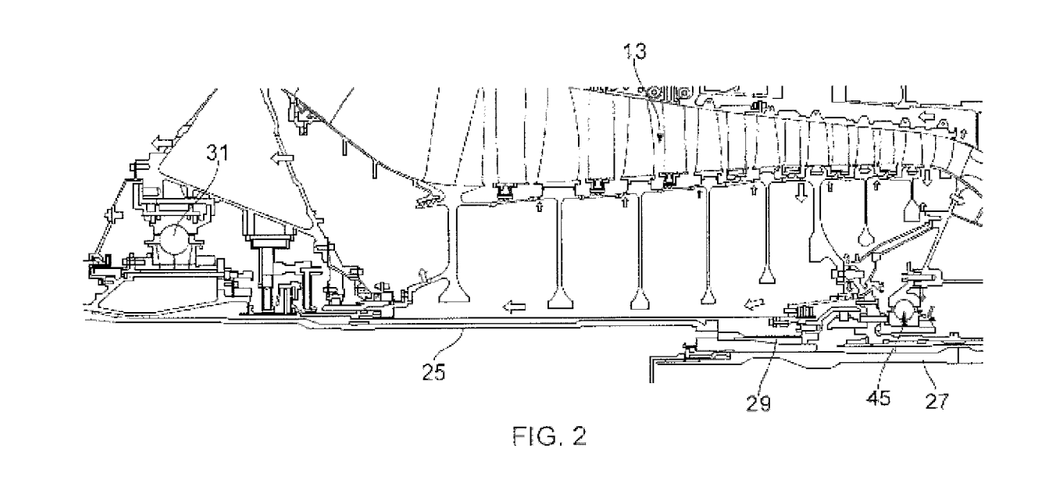
FIG. 2 shows a closer view of a central part of the mainline shaft joining the fan and the low-pressure turbine of the engine.

FIG. 2 shows a closer view of a central part of the mainline shaft for the fan 12 and the low-pressure turbine 18 of the engine. The mainline shaft comprises a front fan shaft 25 and a smaller diameter low-pressure turbine shaft 27, the two portions being joined by splined engagement formations. The fan shaft is supported and located by a ball-bearing-based front bearing 31, the fan 12 being connected to the fan shaft forward of the front bearing. The low-pressure turbine shaft is supported by a roller-bearing-based rear bearing (not shown in FIG. 2) located in a tail bearing housing at the rear of the low-pressure turbine 18.

Figure 3:
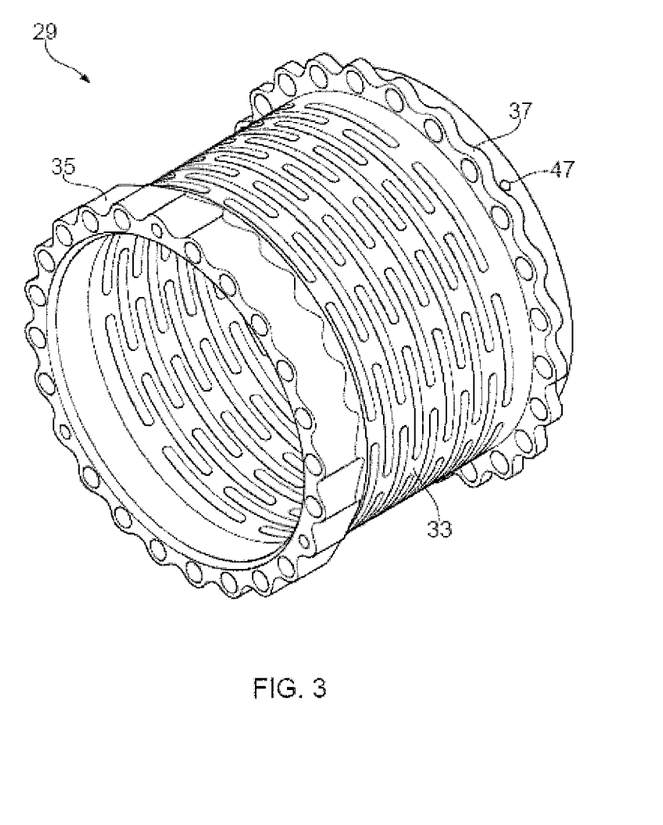
FIG. 3 shows a perspective view of stub shaft of the mainline shaft of FIG. 2.
Figure 4:
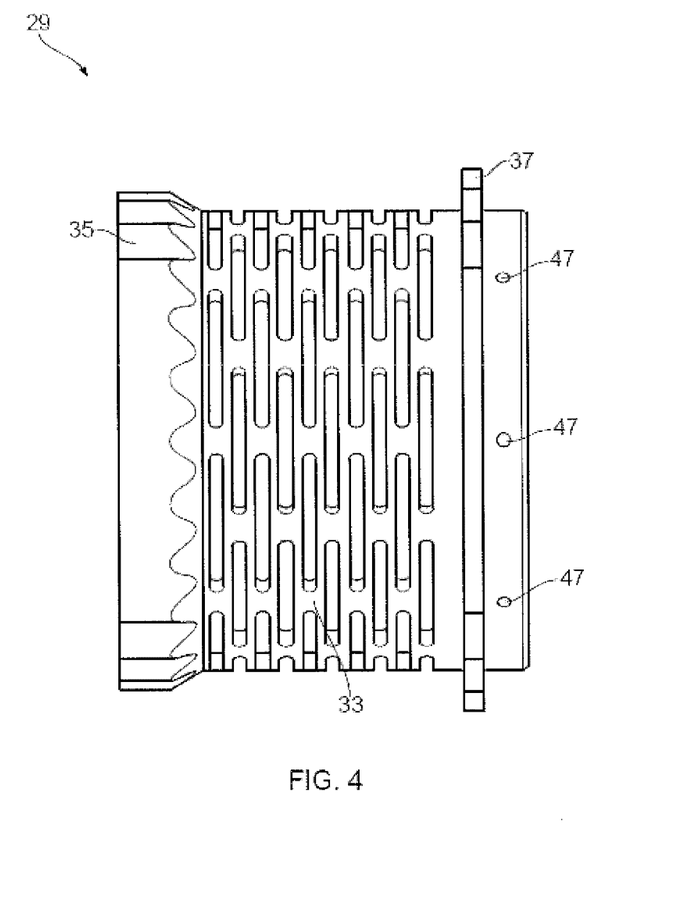
FIG. 4 shows a side view of stub shaft.

FIGS. 3 and 4 show respectively perspective and side views of a stub shaft 29, which is positioned on a rear, reduced-diameter portion of the fan shaft 25 and connects at its rear end to an inner bearing race 45 of an internal gearbox locating the mainline shaft of the intermediate-pressure compressor 13 and turbine 17 on the mainline shaft for the fan 12 and the low-pressure turbine 18. The stub shaft has an annular body 33 with a front flange 35 for bolting to the fan shaft 25, and a rear flange 37 for bolting to the bearing race. The scalloped shape of the rear flange reduces weight and facilitates removal of the stub shaft from the bearing race, while the scalloped shape of the front flange also reduce weight and allows tools to reach past the front flange to reach the rear flange.

A row of shear pins 47 at the rear end of the stub shaft 29 extend between the stub shaft and the reduced-diameter portion of the fan shaft 25. These pins allow axial load to be transmitted from the fan shaft to the bearing race via the rear end of the stub shaft.

Figure 5:
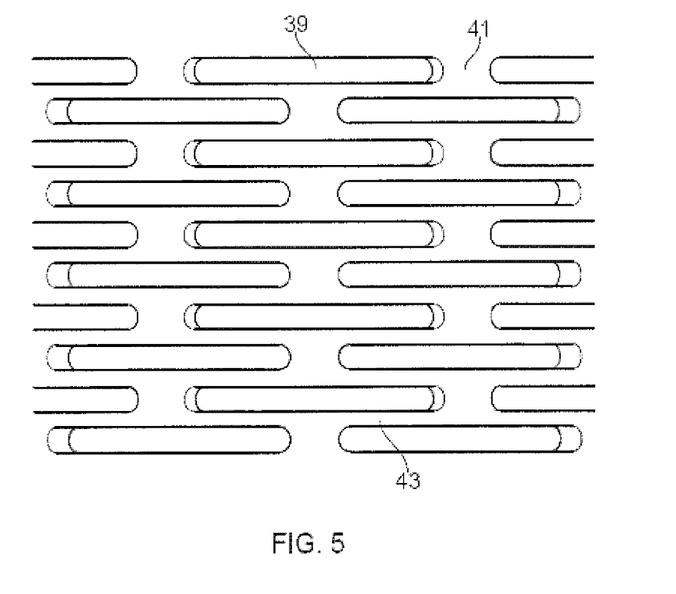
FIG. 5 shows a close-up view of part of the outer surface of the annular body of the stub shaft.

FIG. 5 shows a close-up view of part of the outer surface of the annular body. A plurality of circumferential rows of spaced slots 39 are formed in the body. The length directions of the slots are aligned with the circumferential directions of the rows. Between the slots of each row inter-slot ligaments 41 are formed, the arcuate end shapes of the slots giving the ligaments a narrowed waist. The rows are axially spaced along the body, typically at a constant spacing. However, successive rows are offset so that, discounting the ligaments of the axially forwardmost and rearwardmost rows which each have only one neighbouring row, each ligament is sandwiched between a forward slot and a rearward slot of its two neighbouring rows. In this way, each ligament is joined to adjacent ligaments of its neighbouring rows by circumferentially-extending bars 43 having a thickness in the axial direction corresponding to the axial spacing between the rows.

Preferably alternate rows of slots 39 are aligned such that the ligaments 41 of every other row are at the same angular positions. Further, each ligament may be sandwiched between the mid-points of adjacent slots of its neighbouring rows. In this way, each ligament connects at one axial end to two bars 43, and at the other axial end to two other bars in a characteristic H-shaped arrangement.

Figure 6A:
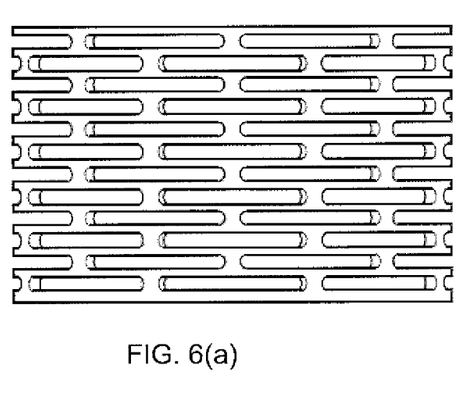
FIG. 6(a) shows schematically the annular body of the stub shaft in an uncollapsed state.
Figure 6B:
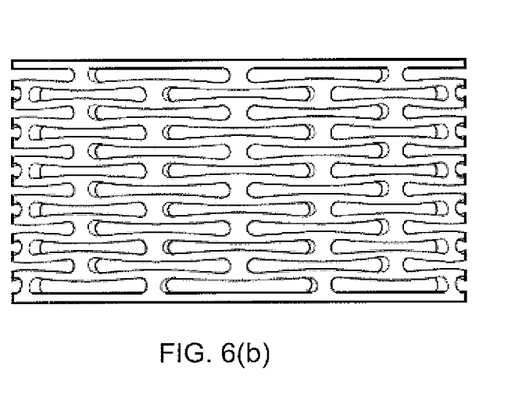
FIG. 6(b) shows schematically the annular body of the stub shaft in a collapsed state.

FIG. 6 shows schematically the annular body of the stub shaft 29 in (a) uncollapsed and (b) partially collapsed states. On compressive loading, the bars 43 deform in a controlled fashion. However, advantageously, the stub shaft can maintain a relatively consistent reactive load during compression. The stub shaft is also able to remain partially elastic such that on relaxation of the compressive displacement the structure maintains some resistive force.

More particularly, under initial compression the bars 43 bend, pushing the ligaments 41 into the slots 39, and allowing the entire structure to act as a spring. However, once the overall compression of the structure is greater than the width of one slot, failure of the bars does not cause a loss of reactive force. When a bar fails, the load it was carrying is distributed to adjacent bars, increasing the stresses in them and causing them also to fail. Further, when there is nothing supporting a given H-shaped arrangement, its ligament moves further into the slot until prevented from further movement by contact on the opposite side of the slot. However, this contact prevents the loss of reactive load even if all the bars in a row fail.

Maintaining a relatively consistent reactive load during compression is beneficial in the event of a fan shaft failure. In particular, after such a failure, location of the low-pressure system is generally lost as the location bearing 31 is positioned in a front bearing housing. The low-pressure system thus moves rearwardly supported on the rear bearing until the stub shaft 29 clashes with the internal gearbox containing the bearing system of the intermediate-pressure mainline shaft (see FIG. 2). This clash causes a high axial load to pass through the shear pins 47, resulting in their failure followed by a controlled collapse of the annular body 33 with a consistent reactive load. The low-pressure system can thus continue to move rearwardly, allowing the rear rotor disc of the low-pressure turbine 18 to tangle with a snubber of the tail bearing house, thereby reducing engine overspeed. Advantageously, reduction in the required overspeed capability of the disks of the low-pressure turbine 18 allows for a significant weight reduction in the design of the turbine.

Figure 7:
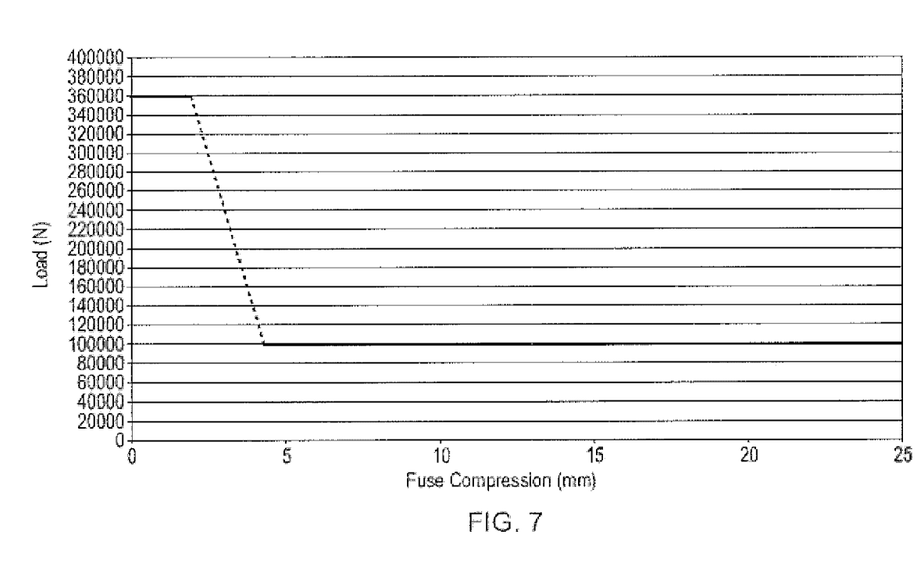
FIG. 7 shows a graph of maximum permitted reaction load against compression of the stub shaft.
Figure 8:
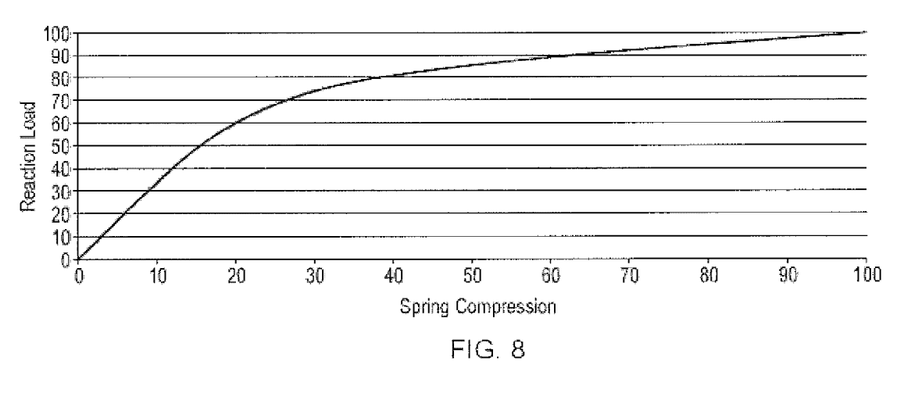
FIG. 8 shows a graph of actual reaction load against compression of the annular body of the stub shaft (arbitrary units)

FIG. 7 shows a graph of maximum permitted reaction load against compression of the stub shaft 29. The high initial maximum permitted load is for when the load is being carried by the shear pins 47, and the subsequent lower maximum permitted load is for when the load is being carried by the collapsing annular body 33. FIG. 8 shows a graph of actual reaction load against compression of the annular body 33 (arbitrary units). After an initial purely elastic response, the controlled collapse of the annular body produces only a slowly increasing reaction load over a large range of compressive deformations. This allows the stub shaft not to exceed the maximum permitted reaction load.

Moreover, maintaining partial elasticity of the stub shaft 29 on relaxation of the compressive displacement helps to prevent unrestricted movement of the low-pressure system which could compromise the sealing between the internal gearbox and the housing of the front bearing 31. More particularly, if the stub shaft did not provide a positive force on such relaxation, the air pressure difference between the front bearing housing and the internal gearbox could open up the contact where the stub shaft clashes with the internal gearbox, allowing internal gearbox air to flow freely into the front bearing housing and potentially causing an oil fire.

In summary, the stub shaft 29 has relatively high stiffness, and so is able to provide a high reactive force at low displacement. However, it is also able to accommodate large displacements without totally failing and losing all reactive force.

Figure 9:
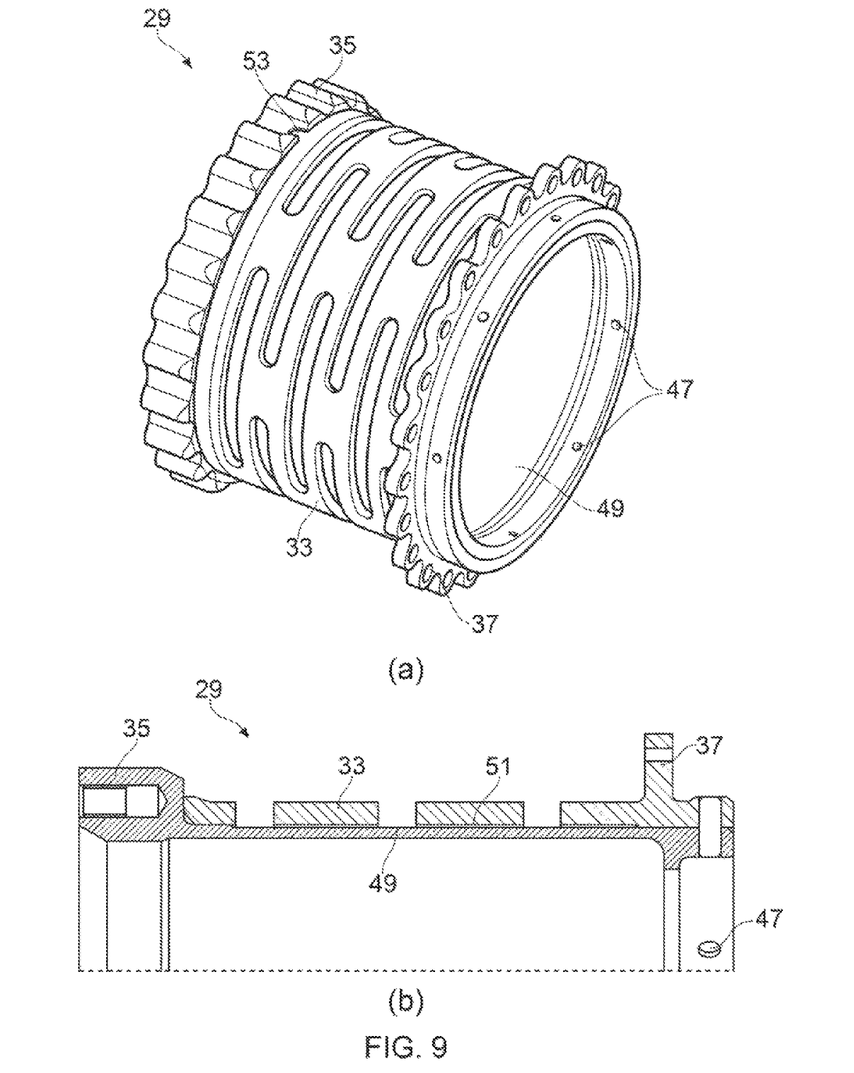
FIG. 9(a) shows a perspective view of a variant of the stub shaft.
FIG. 9(b) shows a longitudinal cross-section view of a variant of the stub shaft.

FIG. 9 shows (a) perspective and (b) longitudinal cross-section views of a variant of the stub shaft 29. In the variant the annular body 33 is formed as a sleeve surrounding a second annular body 49. The front flange 35 for bolting to the fan shaft 25 is provided at the end of the second annular body, and the rear flange 37 for bolting to the bearing race is provided at the end of the sleeve 33.

The shear pins 47 now extend between the sleeve 33 and the second annular body 49 at the rear of the stub shaft 29. The pins allow axial load to be transmitted from the fan shaft 25 to the bearing race via the second annular body and the rearmost part of the sleeve.

The front and rear ends of the sleeve interference fit on the second annular body, but between these fits a clearance 51 is formed between the sleeve and the second annular body to prevent interference between the deflecting bars 43 and the second annular body. Advantageously, during normal running, any torque loads which may be applied to the stub shaft 29, e.g. by from wind-up torque, can be transmitted via the second annular body 49, thereby avoiding the accidental deformation of the controlled collapse structure of the sleeve 33.

Anti-rotation tabs 53 can be formed at the front end of the sleeve to engage with matching recesses in the front flange 35. When the shear pins 47 have sheared on fan shaft failure and the sleeve 33 is undergoing controlled collapse, these tabs can prevent the sleeve spinning on the second annular body 49 due to friction torque from contact with the inner bearing race 45 of an internal gearbox.

While the invention has been described in conjunction with the exemplary embodiments described above, many equivalent modifications and variations will be apparent to those skilled in the art when given this disclosure. For example, such a stub shaft can also be used to allow controlled axial movement of the intermediate or high-pressure mainline shaft. Accordingly, the exemplary embodiments of the invention set forth above are considered to be illustrative and not limiting. Various changes to the described embodiments may be made without departing from the scope of the invention as defined by the accompanying claims.

The invention claimed is:

1. A controlled collapse stub shaft for allowing controlled axial movement of a mainline shaft which joins a fan or compressor to a turbine of a gas turbine engine, a first end of the stub shaft being adapted to be joined to the mainline shaft, a second end of the stub shaft being adapted to be joined to a part of the engine which is axially stationary relative to the controlled axial movement of the mainline shaft, and the stub shaft further having a first annular body between the first and second ends, the annular body containing a plurality of axially-spaced circumferential rows of circumferentially-extending slots, inter-slot ligaments being formed between the slots of each row, and successive axially-spaced rows being offset, whereby, the ligaments of the axially forwardmost and rearwardmost rows excepted, each ligament is sandwiched between a forward slot and a rearward slot of its neighbouring rows, and each ligament is joined to adjacent ligaments of its neighbouring rows by circumferentially-extending bars having a thickness in the axial direction corresponding to the axial spacing between the rows, wherein the bars are axially deflectable to allow the axial distance between the first and second ends of the stub shaft to decrease; and a second annular body coaxial with the first annular body, the second annular body providing the first end of the stub shaft adapted to be joined to the mainline shaft, and the first annular body providing the second end of the stub shaft adapted to be joined to the axially stationary part of the engine.

2. The stub shaft according to claim 1, wherein the ratio of the length to the width of the slots is at least 3:1.

3. The stub shaft according to claim 2, wherein a radial clearance is formed between the first and the second annular bodies.

4. The stub shaft according to claim 1, wherein the ratio of the length of the slots to the thickness in the circumferential direction of the ligaments is at least 3:1.

5. The stub shaft according to claim 1, wherein the thickness in the axial direction of the bars is less than the width of the slots.

6. The stub shaft according to claim 1, wherein the thickness in the axial direction of the bars is less than the thickness in the circumferential direction of the ligaments.

7. The stub shaft according to claim 1, wherein every other row is aligned such that the ligaments of these rows are at the same angular positions.

8. The stub shaft according to claim 1, wherein each ligament is sandwiched between the mid-points of the forward and rearward slots of its neighbouring rows.

9. The stub shaft according to claim 1, further comprising a first annular flange at the first end for joining to the mainline shaft.

10. The stub shaft according to claim 9, further comprising a second annular flange at the second end for joining to the axially stationary part of the engine.

11. The stub shaft according to claim 1, further comprising one or more shear formations at the second end of the stub shaft, the shear formations forming a load path for transmitting axial loads between the axially stationary part of the engine and the mainline shaft.

12. The stub shaft according to claim 1, wherein the first annular body is rotationally fixed relative to the second annular body.

13. A gas turbine engine having a mainline shaft which joins a fan or compressor of the engine to a turbine of the engine, and a stub shaft for allowing controlled axial movement of the mainline shaft, the stub shaft having a first end and a second end, the first end of the stub shaft joining to the mainline shaft, and the second end of the stub shaft joining to a part of the engine which is axially stationary relative to the controlled axial movement of the mainline shaft, a first end of the stub shaft being adapted to be joined to the mainline shaft, a second end of the stub shaft being adapted to be joined to a part of the engine which is axially stationary relative to the controlled axial movement of the mainline shaft, and the stub shaft further having a first annular body between the first and second ends, the annular body containing a plurality of axially-spaced circumferential rows of circumferentially-extending slots, inter-slot ligaments being formed between the slots of each row, and successive axially-spaced rows being offset, whereby, the ligaments of the axially forwardmost and rearwardmost rows excepted, each ligament is sandwiched between a forward slot and a rearward slot of its neighbouring rows, and each ligament is joined to adjacent ligaments of its neighbouring rows by circumferentially-extending bars having a thickness in the axial direction corresponding to the axial spacing between the rows, wherein the bars are axially deflectable to allow the axial distance between the first and second ends of the stub shaft to decrease; and a second annular body coaxial with the first annular body, the second annular body providing the first end of the stub shaft adapted to be joined to the mainline shaft, and the first annular body providing the second end of the stub shaft adapted to be joined to the axially stationary part of the engine.

* * * * *